(12) United States Patent
Ruhlander

(10) Patent No.: US 7,559,714 B2
(45) Date of Patent: Jul. 14, 2009

(54) REVERSE CLIP CAP TERMINAL CONNECTOR

(75) Inventor: Gregory Phillip Ruhlander, Hannibal, MO (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 1443 days.

(21) Appl. No.: 10/159,755

(22) Filed: May 30, 2002

(65) Prior Publication Data

US 2003/0223805 A1 Dec. 4, 2003

(51) Int. Cl.
*F16C 1/14* (2006.01)
*F16C 1/12* (2006.01)

(52) U.S. Cl. ................. 403/263; 403/165; 403/329; 403/361; 74/502.4; 74/502.6

(58) Field of Classification Search .......... 403/165, 403/263, 329, 374.1, 361; 74/502.4, 502.6
See application file for complete search history.

(56) References Cited

U.S. PATENT DOCUMENTS

| | | | | |
|---|---|---|---|---|
| 2,784,987 A | * | 3/1957 | Corcoran | 285/82 |
| 3,677,585 A | | 7/1972 | Scheerer | 287/87 |
| 3,865,437 A | * | 2/1975 | Crosby | 403/165 |
| 4,601,603 A | | 7/1986 | Nakayama | 403/143 |
| 5,265,495 A | * | 11/1993 | Bung et al. | 74/502.6 |
| 5,362,110 A | * | 11/1994 | Bynum | 411/326 |
| 5,884,531 A | * | 3/1999 | Koenig | 74/502.6 |
| 6,748,820 B2 | * | 6/2004 | Ruhlander | 74/502.4 |

FOREIGN PATENT DOCUMENTS

| | | |
|---|---|---|
| DE | 19731039 | 1/1999 |
| DE | 19918911 A1 | 9/2000 |
| EP | 0082638 | 6/1983 |
| EP | 0589550 A1 | 3/1994 |
| EP | 0821168 | 1/1998 |
| FR | 2733285 | 10/1996 |
| GB | 2106173 A | 9/1982 |

* cited by examiner

*Primary Examiner*—Daniel P Stodola
*Assistant Examiner*—Ernesto Garcia
(74) *Attorney, Agent, or Firm*—Banner & Witcoff, Ltd.; Peter D. McDermott; Dean B. Watson

(57) ABSTRACT

A fitting for a terminal connection in a core-adjuster assembly has a generally annular isolator with a generally central bore defining a connector pin socket and a reverse clip cap socket, and a reverse clip cap configured to be received substantially concentrically by the reverse clip cap socket of the isolator and defining a connector pin end socket.

10 Claims, 7 Drawing Sheets

REVERSE CLIP CAP TERMINAL CONNECTOR

FIELD OF THE INVENTION

The present invention relates to motion-transmitting cable assemblies, and to terminal or rod-end assemblies of cable assemblies, and to reverse clip caps and other such fittings for terminal assemblies.

BACKGROUND OF THE INVENTION

Motion-transmitting remote control cable assemblies, such as "push-pull cables," are used for transmitting force or load and/or motion, typically along a curved path e.g. in aircraft, automotive, and marine environments, etc. Known cable assemblies can be used for transmitting load and motion in both push and pull type applications. In the automotive environment, typical applications include, but are not limited to, accelerators, or similar applications.

A motion-transmitting remote control cable assembly for transmitting motion along a curved path typically includes a flexible core element (core or strand) slidably enclosed within a flexible outer sheath (conduit) with a conduit fitting attached to each end. Each conduit fitting attaches to a corresponding bracket or other mounting fixture, support structure or the like. The cable assembly further includes, typically, a terminal sub-assembly at each end. A first terminal sub-assembly is secured (or adapted to be secured) to a controlled member, e.g., a movable lever, etc. of a motor vehicle transmission. The terminal sub-assembly at the other end is secured (or adapted to be secured) to an actuator, i.e. a control member such as a handle, motor output member, etc. Typically, the actuator member and the controlled member each provides a mounting pin or other suitable feature at a mounting point for suitable connection to the corresponding terminal sub-assembly, such that the cable assembly is able to transfer load or motion between the two mounting points. That is, moving the actuator member transmits force/motion via longitudinal movement of the strand within the sheath, to correspondingly move the controlled member. (It should be understood that in some applications the control member and the controlled member may from time to time reverse roles or may otherwise share the control and controlled roles.)

The strand of a motion-transmitting cable assembly is often secured to a mounting pin or other attachment component at the aforesaid mounting point of the controlled or control member by a terminal or core-adjuster assembly. Mounting pins and other such attachment components can have a relatively large dimensional tolerance range due to manufacturing variations and the like. Large dimensional tolerance ranges are seen, for example, in the attachment pins of automobile transmission shift systems. As a result of this large tolerance range, there can be a difference in fit from one unit to the next, between the terminal or core-adjuster assembly and the mounting pin, which in some units results in a gap and the possibility of relative movement between the fitting and the pin referred to as lash. In certain cases lash causes inaccuracy in the transmission shift system throughout its full range of movement. Additionally, these known terminal assemblies often have large installation loads (the forces required to attach the terminal sub-assembly to the pin or other mounting component) in order to obtain correspondingly high extraction loads (the forces required to inadvertently remove the terminal sub-assembly from the pin or other mounting component). Traditionally, the problem of lash is mitigated by the use of an isolator at the interconnection between the pin and the terminal sub-assembly, designed to absorb vibration. The problem with traditional isolators is that by their very nature they must be made of a softer material that has significant give or resiliency to absorb the vibration and as a result suffer from increased wear and breakdown in areas were the force or load is concentrated, i.e. where the pin contacts the isolator. Another problem with traditional terminal assemblies is determining correct orientation during assembly and installation. Having a number of interconnecting part to be assembled and installed on an assembly line can provide a potential for improperly assembled or installed parts that could lead to future failure of the device.

Accordingly, there is a need in the art for improved motion transmitting remote control cable assemblies and for end fittings for motion transmitting remote control cable assemblies, which account for dimensional tolerance ranges of mating components and are operative to reduce vibration during operation. There is also a need for motion transmitting remote control cable assemblies and end fitting for such cable assemblies, which require relatively low installation loads while maintaining relatively high extraction loads. There is also a need for motion transmitting remote control cable assemblies and end fittings for same, resistant to wear or breakdown at the area of the interconnection between the terminal sub-assembly and a mounting pin. There is also a need for terminal assemblies that are simple to assemble and install with proper orientation.

It is an object of the present invention, to provide cable assemblies addressing some or all of the above problems. It is another object to provide end fittings for motion transmitting cable assemblies, addressing some or all of the above problems.

SUMMARY

In accordance with a first aspect, a fitting for a terminal sub-assembly, adapted to receive a connector pin, comprises a generally annular isolator and a reverse clip cap. The reverse clip cap and isolator have corresponding configurations designed to interlock when the fitting is mated with a connector pin. The generally annular isolator has a generally central bore defining a connector pin socket, adapted to receive a connector pin, and a reverse clip cap socket. The reverse clip cap is configured to be received substantially concentrically by the reverse clip cap socket of the isolator and defines a connector pin end socket adapted to engage a connector pin that has been received into the connector pin socket of the isolator. The connector pin end socket has at least one deflectable wall with configurations for securing such connector pin and, as stated above, interlocking with the isolator.

In accordance with another aspect, a terminal sub-assembly comprises a housing, a generally annular isolator, and a reverse clip cap. The housing defines a laterally extending isolator socket. The generally annular isolator is configured to be received substantially concentrically by the isolator socket of the housing and has a generally central bore defining a connector pin socket, adapted to receive a connector pin, and a reverse clip cap socket. The reverse clip cap is configured to be received substantially concentrically by the reverse clip cap socket of the isolator and defines a connector pin end socket adapted to engage a connector pin, and having a deflectable wall with configurations for securing the connector pin, that in assembly with the isolator is substantially coaxial with the connector pin socket. The reverse clip cap and isolator have corresponding configurations designed to interlock when the terminal sub-assembly is mated with a connector pin so as to prevent extraction of the connector pin from the terminal sub-assembly When assembled and installed on a connector pin (also referred to as a terminal pin), the terminal sub-assembly the housing defines a laterally extending isolator socket. The generally annular isolator is inserted substantially concentrically in the isolator socket of the housing and has a generally central bore defining a connector pin socket, adapted to receive a connector pin, and a reverse clip cap socket. The reverse clip cap is inserted substantially concentrically into the reverse clip cap socket of the isolator and defines a connector pin end socket that in assembly with the isolator is substantially coaxial with the connector pin socket. The connector pin is inserted substantially concentrically in the connector pin socket of the isolator and engaged by the connector pin end socket of the reverse clip cap. The structure of the clip cap and terminal sub-assembly make it apparent to one installing the terminal sub-assembly on a connector pin the proper orientation of the terminal sub-assembly on the connector pin. In other words the reverse clip cap is inserted into the reverse clip cap socket of the isolator on one side of the terminal sub-assembly and the connector pin is inserted into the connector pin end socket of the isolator on the other side of the terminal sub-assembly. The connector pin is further inserted into and engaged by the connector pin end socket of the reverse clip cap inside the isolator. In effect the terminal pin deflects the walls of the reverse clip cap connector pin end socket against the interior of the bore of the isolator thereby securing the terminal pin and reverse clip cap in the isolator. The isolator is in turn secured in the housing.

In accordance with another aspect, a reverse clip cap for a terminal sub-assembly configured to be received by a isolator and adapted to secure a connector pin, as discussed above, comprises a head portion, and a generally cylindrical plug portion extending axially from the head portion to a free end and defining a connector pin end socket extending coaxially within the plug member from the free end toward the head portion, The plug portion has exterior configurations adapted to engage an isolator and interior configurations adapted to engage a connector pin. The head portion comprises a flange extending radially beyond the plug portion.

BRIEF DESCRIPTION OF THE DRAWINGS

Certain preferred embodiments are described below with reference to the accompanying figures in which.

Figure 1:
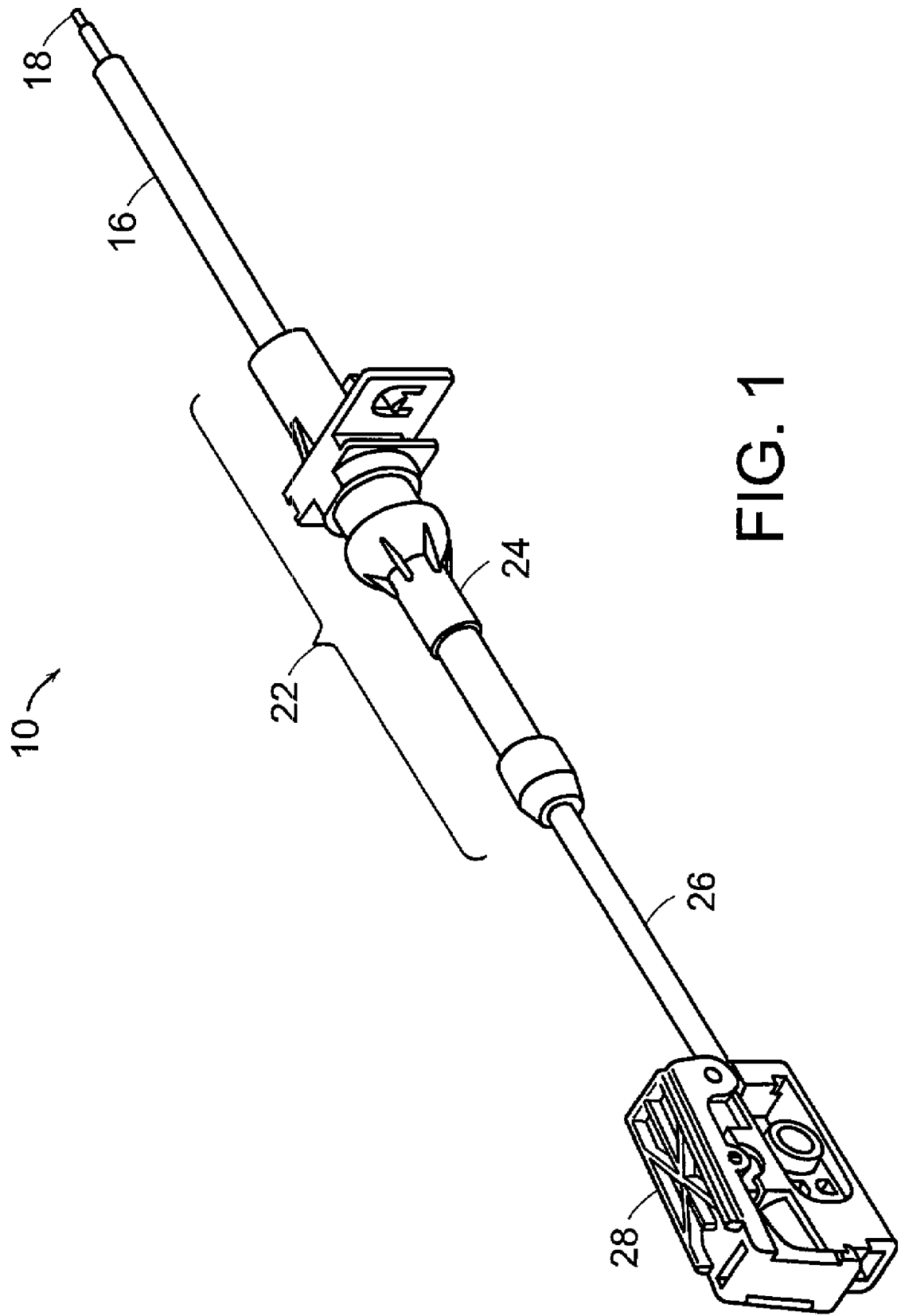
FIG. 1 is a perspective view of a transmission or shifter end of a cable assembly utilizing a core adjuster terminal sub-assembly.

It should be understood that the appended drawings are not necessarily to scale, presenting a somewhat simplified representation of various preferred features illustrative of the basic principles of the invention. The specific design features of the remote-control cable assembly as disclosed herein, including, for example, specific dimensions, orientations, and shapes of the isolator and adapter ring will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the remote control cable assemblies illustrated in the drawings. In general, up or upward refers to an upward direction in the plane of the paper in FIG. 1 and down or downward refers to a downward direction in the plane of the paper in FIG. 1. Also in general, fore or forward refers to a direction toward the front of the motor vehicle and aft or rearward refers to a direction toward the rear of the motor vehicle.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved motion-transmitting remote control cable assemblies disclosed herein. The following detailed discussion of various alternative and preferred embodiments will illustrate the general principles of the invention with reference to a remote control cable assembly for use with a motor vehicle transmission shifter system. Other embodiments suitable for other applications will be apparent to those skilled in the art given the benefit of this disclosure.

Referring now to the drawings, FIG. 1 shows a preferred embodiment of a transmission or shifter end of a remote control cable assembly 10 for a transmission shift assembly of a motor vehicle, such as an automobile, according to a preferred embodiment of the present invention. While the illustrated embodiments of the present invention are particularly adapted for use with an automobile, it is noted that the present invention can be utilized with any motor vehicle including trucks, buses, vans, recreational vehicles, earth moving equipment and the like, off road vehicles such as dune buggies and the like, air borne vehicles, and water borne vehicles. While the illustrated embodiments of the present invention are particularly adapted for use with a transmission shift assembly, it is also noted that the present invention can be utilized with other motor vehicle systems such as, for example, accelerator, or similar applications.

As shown in FIG. 1, the remote control cable assembly 10 includes flexible cable having a flexible outer sheath or conduit member 16 and a flexible inner core or strand member 18 longitudinally slidable within the conduit member 16. The conduit member 16 is secured to a rigid structure (not shown) by a conduit fitting 22 such as, for example, the conduit fittings disclosed in U.S. Pat. Nos. 5,862,710 and 5,884,531, the disclosures of which are expressly incorporated herein in their entirety by reference. The conduit fitting 22 typically includes a tube member or other guide means 24 which is preferably connected by a swivel joint to allow for swiveling movement of the tube member 24 relative to the conduit member 22. The strand member 18 is connected to a rod member 26 of a terminal sub-assembly or core adjuster 28, also referred to as a core-adjuster described in more detail hereinbelow. The strand member 18 can be secured to the rod member 26 in any suitable manner such as, for example, staking or crimping. The rod member 26 longitudinally moves within the tube member 24 to define a line of force as the rod member 26 is actuated to move into and out of the tube member 24. The core-adjuster 28 is connected to a control component or member, such as a shifter pin or transmission end pin (not shown), to be actuated such that movement of the strand member 18 and rod member 26 actuates the control member.

Figure 2:
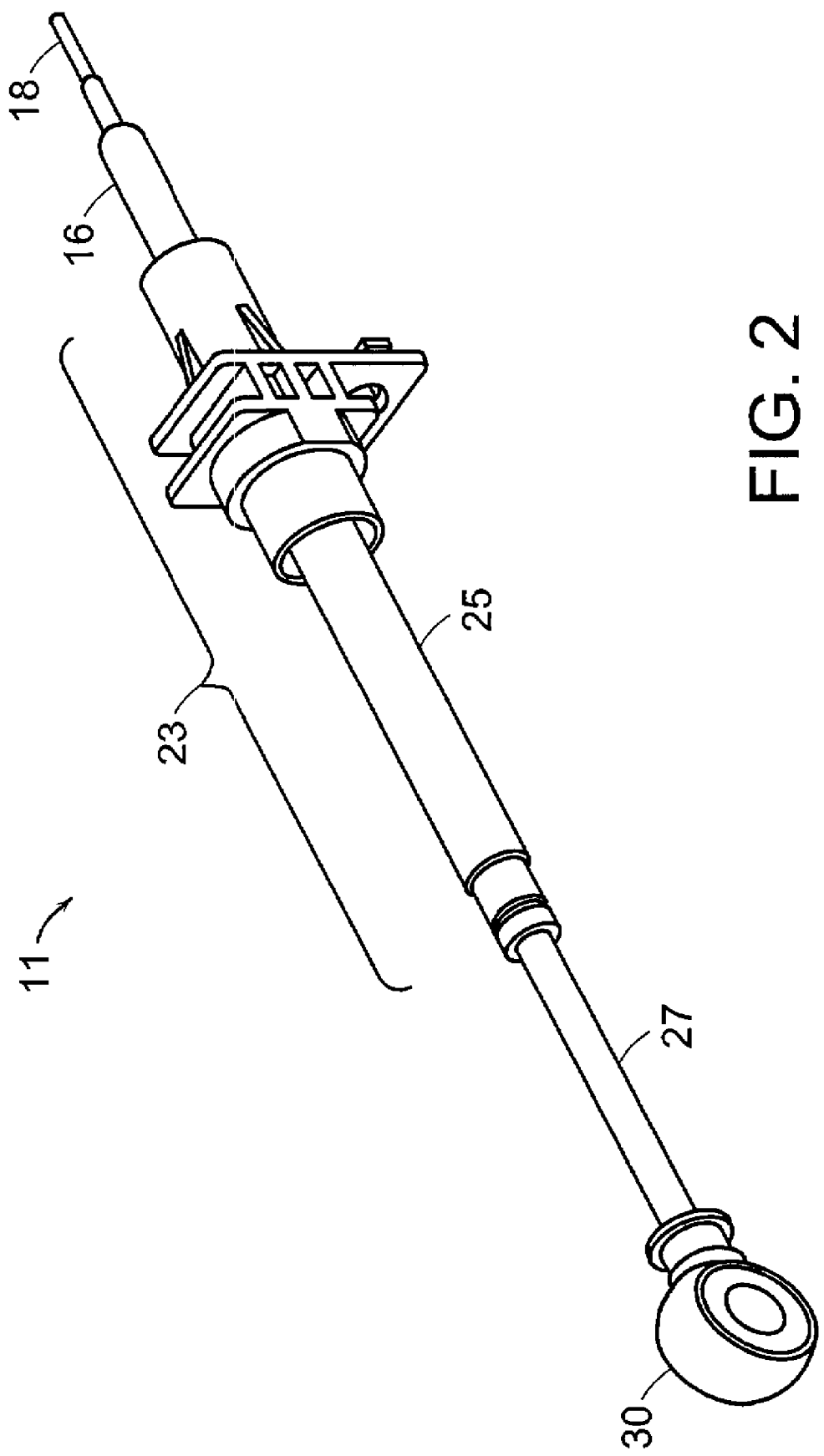
FIG. 2 is a perspective view of a shifter end of a cable assembly utilizing a rod end terminal sub-assembly.

Referring now to FIG. 2, the shifter end of a remote control cable assembly 11 for a transmission shift assembly of a motor vehicle, such as an automobile, according to a preferred embodiment. The remote control cable assembly 11 includes flexible cable having a flexible outer sheath or conduit member 16 and a flexible inner core or strand member 18 longitudinally slidable within the conduit member 16. The conduit member 16 is secured to a rigid structure (not shown) by a conduit fitting 23, such as, for example, any suitable ones of the conduit fittings disclosed in U.S. Pat. Nos. 5,862,710 and 5,884,531, the disclosures of which are expressly incorporated herein in their entirety by reference. The conduit fitting 23 corresponds generally to the conduit fitting 22 of FIG. 1. in form and function, typically including a tube member or other guide means 25 which is preferably connected by a swivel joint to allow for swiveling movement of the tube member 25 relative to the conduit member 23. The strand member 18 is connected to a rod member 27 of a shifter end terminal sub-assembly 30, also known as a rod end, described in more detail hereinbelow. The strand member 18 can be secured to the rod member 27 in any suitable manner such as, for example, staking or crimping. The rod member 27 longitudinally moves within the tube member 25 to define a line of force as the rode member 27 is actuated to move into and out of the tube member 25. The rod end 30 is connected to a control component or member, such as a transmission pin (not shown), to be actuated such that movement of the strand member 18 and rod member 27 actuates the control member.

In accordance with certain preferred embodiments, a terminal sub-assembly adapted to be mounted on a connector pin—includes a housing forming isolator socket, preferably a laterally extending isolator socket; a generally annular isolator configured to be received substantially concentrically by the isolator socket of the housing and having a generally central bore forming a connector pin socket, adapted to receive a connector pin, and a reverse clip cap socket; and a reverse clip cap configured to be received substantially concentrically by the reverse clip cap socket of the isolator and defining a connector pin end socket adapted to engage a connector pin, and having a deflectable wall with a configurations for securing the connector pin that in assembly with the isolator is substantially coaxial with the connector pin socket.

There are typically two forms of a terminal sub-assembly in an automotive transmission cable assembly: the core adjuster for use on the transmission or shifter end of the cable assembly, and the rod end for use on the shifter side of the cable assembly. It should be noted that these are but two possible configurations and uses for a terminal sub-assembly and other configurations and uses will be apparent to one skilled in the art given the benefit of this disclosure.

The housing can be any suitable housing that is capable of defining an isolator socket. Preferably the isolator socket is a laterally extending socket. In certain embodiments it is made of plastic or other suitable materials. In other embodiments the housing may be made of metal. Other embodiments will be apparent to one skilled in the art given the benefit of this disclosure.

Suitable isolators include, e.g. isolators that can absorb vibration in the cable assembly. The isolator is generally annular and configured to be received substantially concentrically by the isolator socket of the housing. The isolator has a generally central bore forming a connector pin socket, adapted to receive a connector pin, and a reverse clip cap socket. As used here generally central means that the bore is not so close to the periphery of the isolator as to render the isolator ineffective for it's intended purpose. In a preferred embodiment the connector pin socket and reverse clip cap socket form opposite ends of the central bore. Preferably the isolator is made from a soft plastic such as thermoplastic elastomer or plastomer. In certain embodiments the isolator and the isolator socket of the housing have corresponding configurations adapted to interlock with each other in assembly. In other embodiments the isolator and isolator socket of the housing have configurations adapted to releasably interlock. An example of suitable releasably interlocking configurations is a snap fit connection. Other embodiments will be apparent to one skilled in the art given the benefit of this disclosure.

Suitable reverse clip caps include, e.g. devices capable of engaging a terminal pin in conjunction with an isolator and housing. Preferably the reverse clip cap is configured to be received substantially concentrically by the reverse clip cap socket of the isolator and defines a connector pin end socket adapted to engage a connector pin. the conncetor pin socket has a deflectable wall with configurations for securing a connector pin. Suitable configurations include beads, ridges, indents and snap fit connections. In a preferred embodiment the reverse clip cap is made from a hard plastic such as thermal plastic, for example Nylon 6-6 glass filled or similar material. In some embodiments the reverse clip cap and clip cap socket of the isolator have configurations adapted to interlock. Examples of such configurations include beads, ridges, and indents. In other embodiments the reverse clip cap and the reverse clip cap socket of the isolator have configurations that are releasably interlocking. An example of suitable releasably interlocking configurations is a snap fit connection. In use, when the a connector pin is inserted into the connector pin socket of the reverse clip cap, the pushes the deflectable wall of the reverse clip cap outward against the isolator thereby engaging the configurations and interlocking the reverse clip cap and isolator as the same time the connector pin is engaged by the configuration for securing the connector pin thereby increasing the extraction load for the connector pin. Other embodiments will be apparent to one skilled in the art given the benefit of this disclosure.

In certain embodiments the terminal sub-assembly further includes a connector rod, also referred to as a rod member, extending longitudinally from the housing of the terminal sub-assembly. The connector rod is where the terminal sub-assembly is attached to the core strand of the cable assembly. The connector rod is preferably unitary with the terminal sub-assembly, that is, the housing is formed around the connector rod making the connector rod and housing one piece. The connector rod is preferably tubular in shape and can be made of any suitable material, preferably metals such as stainless steel and 1008-1010 carbon steels. Other embodiments will be apparent to one skilled in the art given the benefit of this disclosure.

Figure 3:
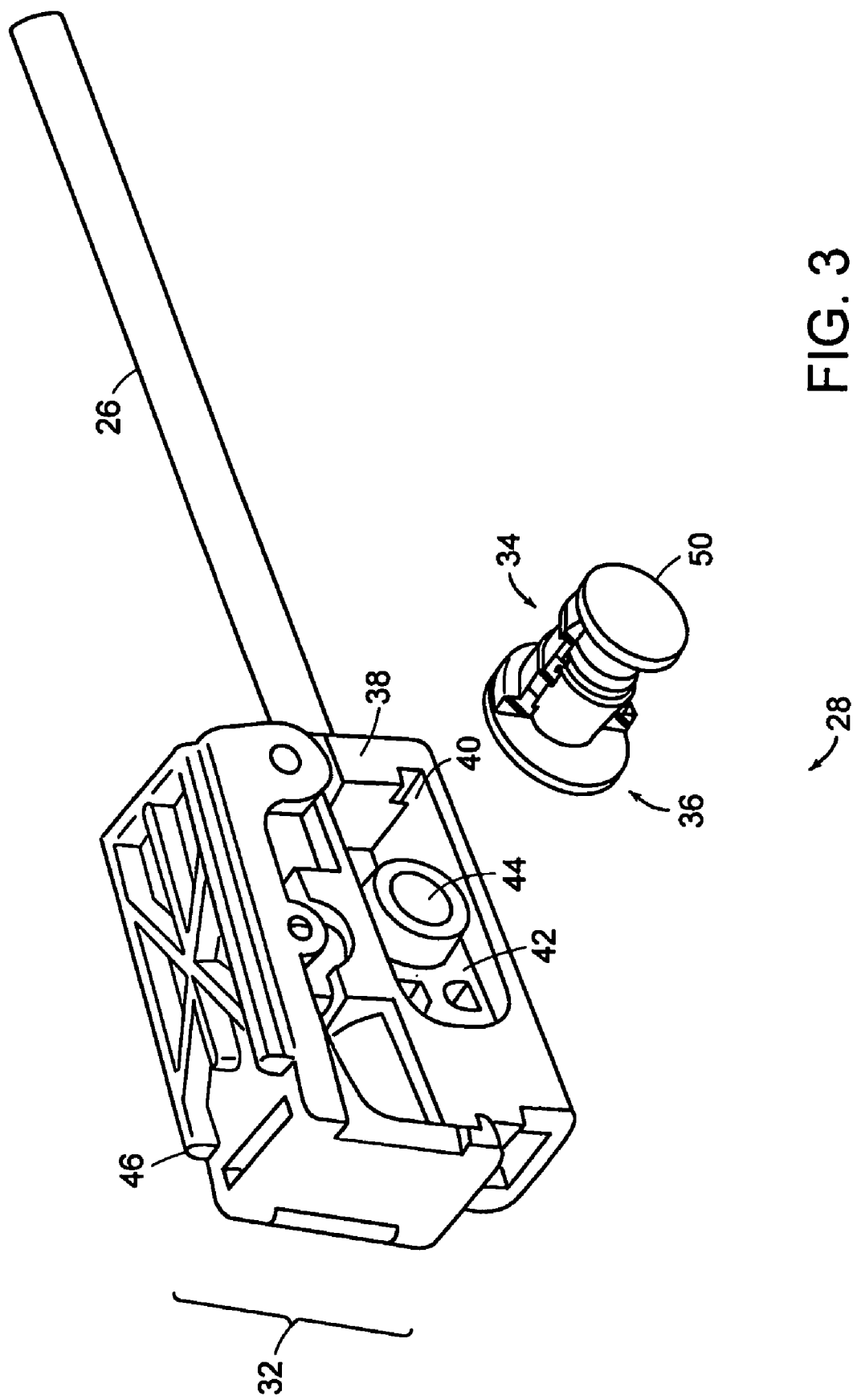
FIG. 3 is a close-up perspective view of a preferred embodiment of a core adjuster terminal sub-assembly as shown in FIG. 1.

Referring now to FIG. 3, in one preferred embodiment the terminal sub-assembly is a core adjuster 28 for use on the transmission end of a cable assembly. The core adjuster 28 includes a housing 32, an isolator 34, and a reverse clip cap 36. The housing 32 of the core adjuster further includes an outer body 38 defining a slideway 40; a slider longitudinally slidably mounted in the slideway 40 of the outer body 38, forming a laterally extending isolator socket 44; and a lock 46 for releasably fixing the longitudinal position of the slider 42 in the slideway 40. In certain embodiments the core adjuster 28 further includes a connector rod 26, also referred to as a rod member, extending longitudinally from the outer body 38 of the core adjuster 28.

In assembly the isolator 34 is received substantially concentrically by the isolator socket 44 of the slider 42. The reverse clip cap 36 is received substantially concentrically by the isolator 34. The core adjuster 28 is mounted with on a connector pin 50 attached to a control member of the transmission (not shown). The structure of the clip cap 36 and core adjuster 28 make it apparent to one installing the core adjuster 28 on a connector pin 50 the proper orientation of the core adjuster 28 on the connector pin 50. In other words the reverse clip cap 36 is inserted into the isolator 34 on one side of the core adjuster 28 and the connector pin 50 is inserted into the isolator 34 on the other side of the core adjuster 28. The connector pin 50 is further inserted into and engaged by the reverse clip cap 36 inside the isolator 34. In effect the connector 50 pin deflects the walls of the reverse clip cap against the interior of the bore of the isolator 34 thereby securing the connector pin 50 and reverse clip cap 36 in the isolator 34. The isolator 34 is in turn secured in the isolator socket 44 of the slider 42 in the housing 32. The slider 42 allows an installer to make any necessary adjustments which are then fixed using the lock 46.

In certain embodiments, as seen in FIG. 3, the isolator 34 and the isolator socket 44 have corresponding configurations 234 and 244, respectively, adapted to interlock with each other in assembly.

Figure 4:
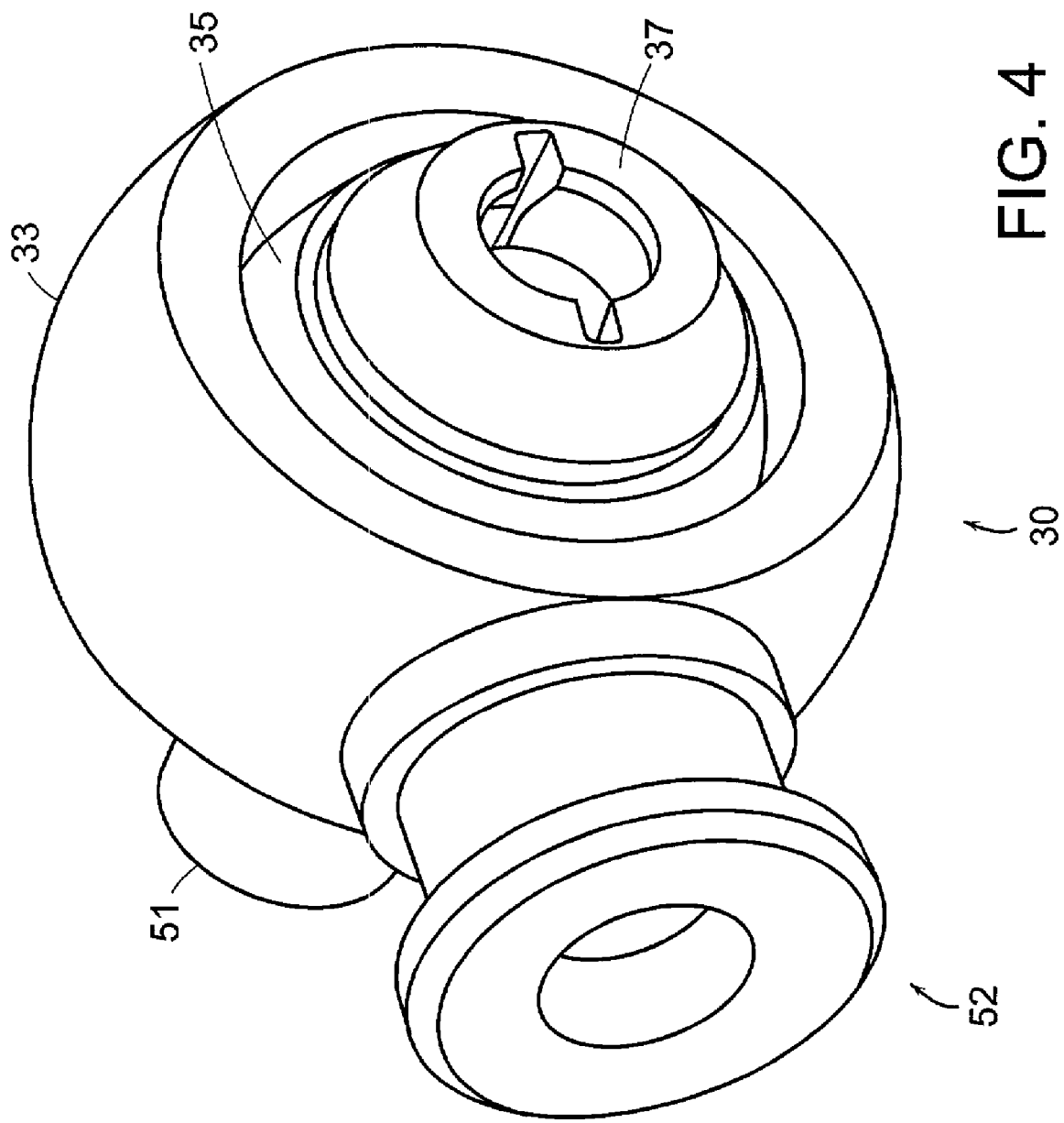
FIG. 4 is a close-up perspective view of a preferred embodiment of a rod end terminal sub-assembly as shown in FIG. 2.

In another preferred embodiment, as shown in FIG. 4, the terminal sub-assembly is a rod end for use on the shifter side of a cable assembly. The rod end includes a housing 33, an isolator 35, and a reverse clip cap 37. In assembly the reverse clip 37 is received by the isolator 35, the isolator 35 is received by the housing 33 and the entire rod end 30 is mounted/mated with terminal pin 51 of a control member of the shifter (not shown). In certain embodiments the housing further includes a fitting 52 for attaching a connector rod 27.

In accordance with certain preferred embodiments, a fitting for a terminal sub-assembly includes a generally annular isolator having a generally central bore defining a connector pin socket, adapted to receive a connector pin, and a reverse clip cap socket, and a reverse clip cap configured to be received substantially concentrically by the reverse clip cap socket of the isolator and defining a connector pin end socket.

Suitable isolators include e.g. isolators configured to fit in a housing of a terminal sub-assembly and capable of absorbing or reducing vibration in the cable assembly. In certain embodiments the connector pin socket and the reverse clip cap socket define opposite ends of the central bore of the isolator. Preferably the isolator is formed of soft plastic or the like. Examples of suitable materials include thermal plastic elastomer or plastimer. Other embodiments will be apparent to one skilled in the art given the benefit of this disclosure.

Suitable reverse clip caps include e.g. devices configured to work in conjunction with an isolator to engage a terminal pin. In certain embodiments the reverse clip cap in assembly with the isolator is substantially coaxial with the connector pin socket. Preferably, the reverse clip cap is made of hard plastic or the like. Examples of suitable materials include thermal plastic, for example Nylon 6-6 glass filled or similar material. In some embodiments the reverse clip cap and the reverse clip cap socket of the isolator have corresponding configurations adapted to interlock with each other in assembly. In other embodiments the reverse clip cap and the reverse clip cap socket have corresponding configurations that releasably interlock. In certain specific embodiments the reverse clip cap is configured to snap fit into the reverse clip cap socket of the isolator. Other embodiments will be apparent to one skilled in the art given the benefit of this disclosure.

In certain embodiments, the connector pin end socket of the reverse clip cap is formed of generally annular deflectable walls having configurations operative, cooperatively with each, other to interlock with a terminal pin. In certain such embodiments the generally annular deflectable walls have configurations operative to releasably interlock with a terminal pin.

Figure 5:
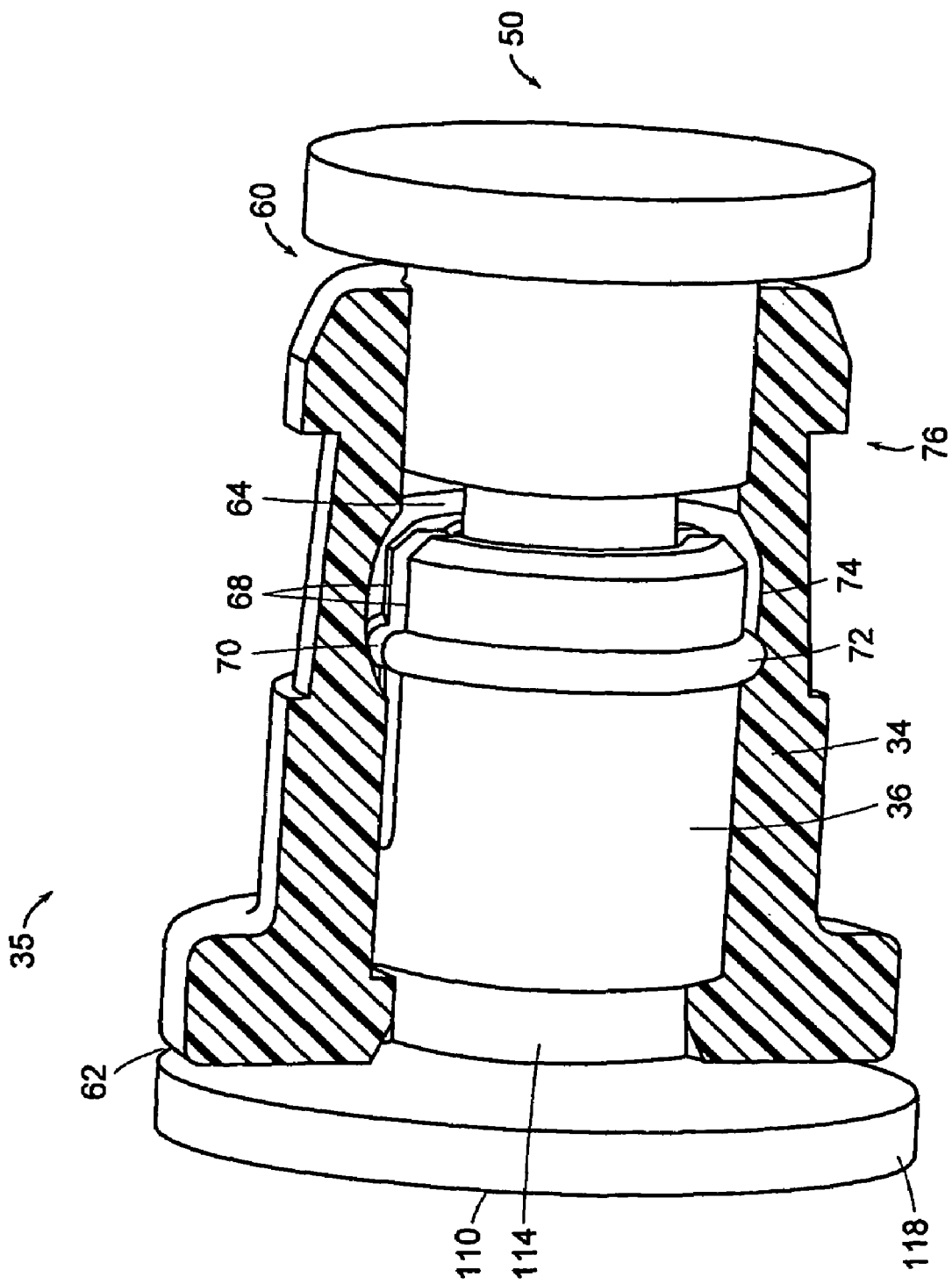
FIG. 5 is a cut away view of a preferred embodiment of a fitting for a core adjuster terminal sub-assembly as shown in FIGS. 1 and 3.

FIG. 5 depicts a cut away view of a preferred embodiment of a fitting 55 for a core adjuster 28. The fitting 55 includes an isolator 34 and a reverse clip cap 36. The connector pin socket 60 and reverse clip cap socket 62 define opposite ends of the central bore 64 of the isolator 34. The isolator, as discussed above, is preferably made of a soft plastic to absorb vibration in the system. The reverse clip cap is preferably made of a hard plastic so as to better distribute load and increase durability. In certain embodiments the connector pin end socket 66 of the reverse clip cap 36 is formed of generally annular deflectable walls 68 having configurations to interlock with a pin 50. In other embodiments the connector pin socket 66 is generally tubular in shape with a relief notch 70 that allows the socket to expand radially outward to receive a pin 50.

Preferably the reverse clip cap 36 has configuration 72 to interlock with configurations 74 of the isolator 34. Examples of suitable configurations include beads, ridges and indents. In some embodiments these configurations are snap fit connections. In practice, a connector pin 50 is inserted into the connector pin socket 60 of the isolator 34 and subsequently the connector pin end socket 66 of the reverse clip cap 36. The terminal pin presses the deflectable walls 68 of the connector pin end socket 66 against the interior of the central bore 64 of the isolator 34 thereby engaging the interlocking configurations 72, 74. This interlocking of components provides for lower installation loads and subsequently maintaining higher extraction loads. The interlocking may be releasable or permanent. The reverse clip cap 36 may also have interlocking or snap fit configurations in the connector pin end socket 66 for securing a pin 50 of a control member of the shift assembly (not shown).

Figure 6:
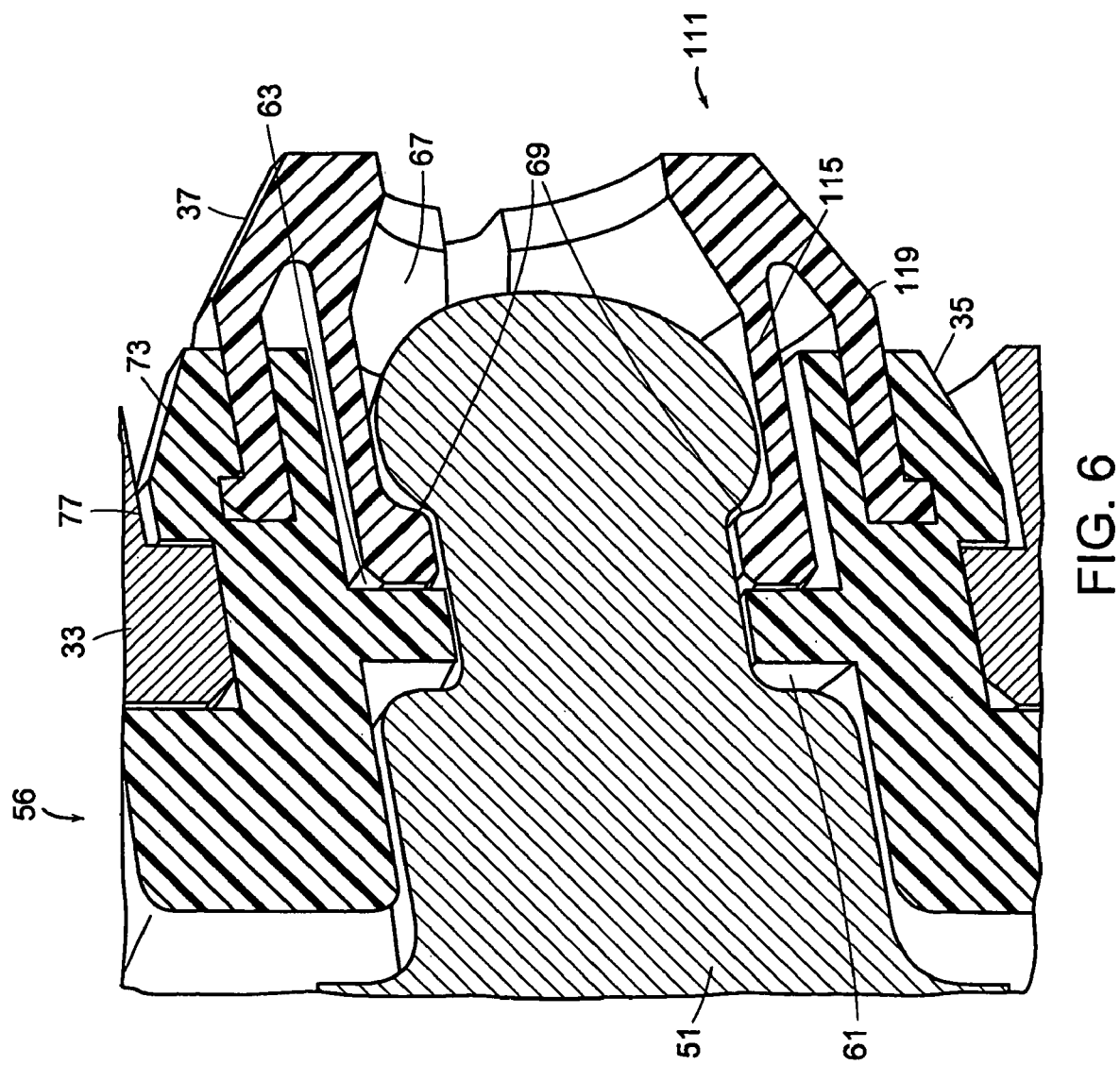
FIG. 6 is a cut away view of a preferred embodiment of a fitting for a rod end terminal sub-assembly as shown in FIGS. 2 and 4.

In another preferred embodiment, as shown in FIG. 6, the fitting is for a rod end assembly for the shifter end of a cable assembly. The fitting 56 includes an isolator 35 forming a connector pin socket 61 and a reverse clip cap socket 63; and a reverse clip cap 37 forming a connector pin end socket 67. The connector pin end socket 67 of reverse clip cap 37 includes deflectable tabs or walls 69 for engaging a connector pin 51. The isolator 35 and reverse clip cap 37 have interlocking configurations 73 allowing for a snap fit connection. The isolator 35 may also snap fit 77 with the housing 33.

In assembly with a connector pin 51 the isolator 35 of the fitting 56 receives the connector pin 51 of a control member (not shown) in the connector pin socket 61. The reverse clip cap 37 is inserted into the reverse clip cap socket 63 located opposite the connector pin socket 61. In inserting the reverse clip cap 37 into the reverse clip cap socket 63 of the isolator 35, the connector pin 51 is engaged by the connector pin end socket 67 of the reverse clip cap 37. The walls 69 of the connector pin end socket 67 are deflected into the interior walls of the isolator while at the same time securing the connector pin 51 in the fitting 56 and housing 33.

In accordance with another embodiment, a reverse clip cap for a terminal sub-assembly includes a head portion; and a generally cylindrical plug portion extending axially from the head portion to a free end and forming a connector pin end socket extending coaxially within the plug member from the free end toward the head portion, wherein the head portion includes a flange extending radially beyond the plug portion. Preferably the reverse clip cap is a unitary piece of hard plastic.

In a preferred embodiment for use with a core adjuster, as shown in FIGS. 3 and 5 and discussed above, a reverse clip cap 36 includes a head portion 110 that is generally planer. From the head 110 extends a generally cylindrical plug portion 114 that defines the connector pin end socket 66. There is at least one relief slot 70 in the cylinder wall 68 that allows the cylinder wall to be deflectable. The reverse clip cap 36 has surface configurations on the outer surface of the plug portion 114 that allow it to snap fit into the isolator 34 as well as surface configurations on the interior of the connector pin end socket 66 for snap fitting with the connector pin 50. The head portion 110 further includes a radial flange 118 extending outward from the plug portion 114.

Figure 7:
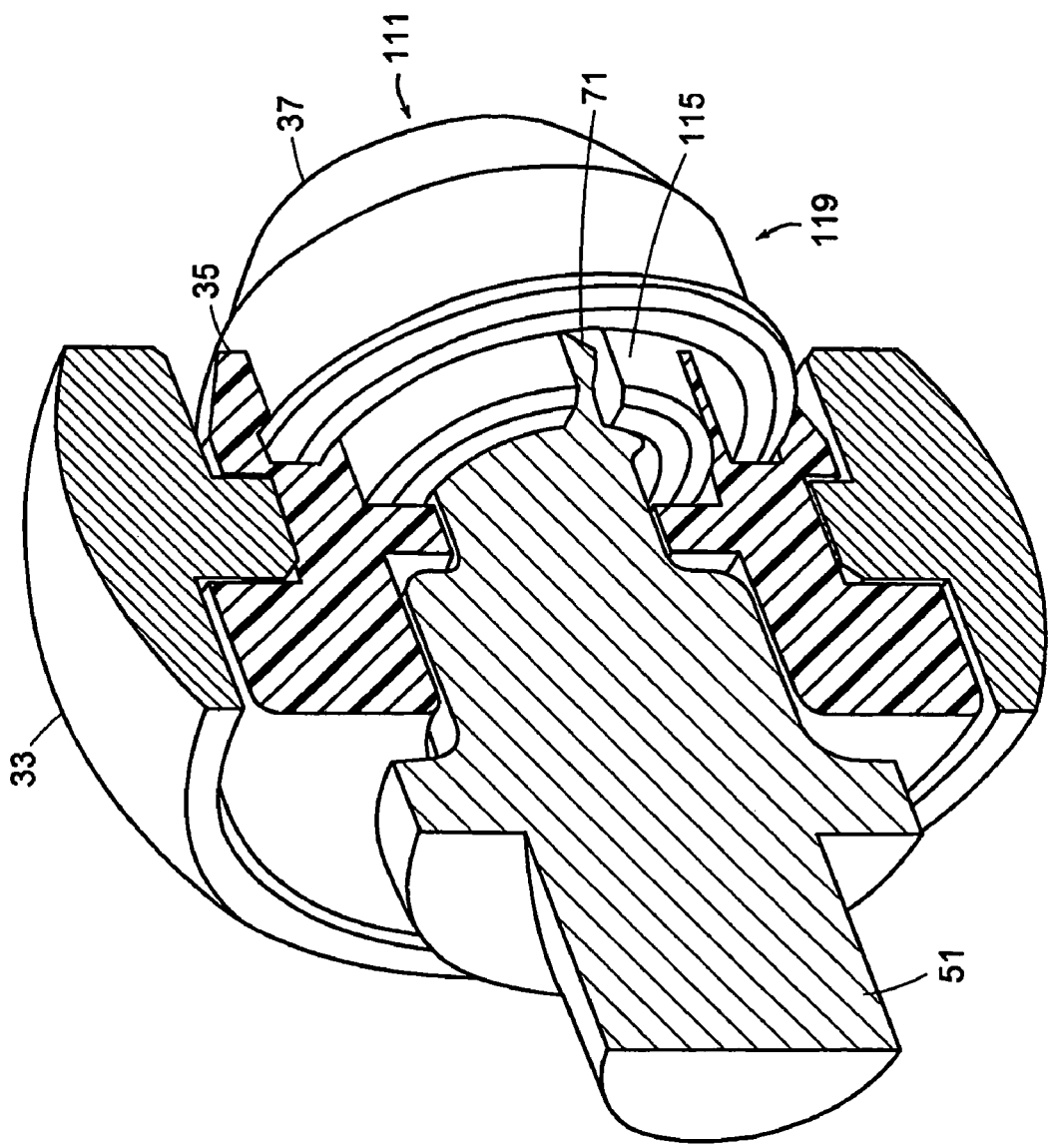
FIG. 7 is another cut-away view of a fitting for a rod end terminal sub-assembly.

In a preferred embodiment for use with a rod end, as shown in FIGS. 6 and 7 and discussed above, a reverse clip cap includes a head portion with a radially extending flange 119. Extending from the head portion, in a direction normal to the flange, is a generally cylindrical plug portion 115 that forms the connector pin end socket 67. There is at least one relief slot 71 in the cylindrical plug 115 wall that allows the cylindrical plug wall be deflectable. The reverse clip cap 37 has configurations 73 on the radially extending flange 119 that allow it to snap fits into the isolator as well as surface configurations on the interior of the connector pin end socket for snap fitting with a terminal pin. In use, when the reverse clip cap 37 is inserted into the reverse clip cap socket 63 of the isolator and is engaged by a terminal pin 51. The plug wall is deflected away from the terminal pin 51 and against the interior of the isolator 35. The configurations 73 secure the reverse clip cap 37, and subsequently the terminal pin 51 in the isolator 35 which is in turn secured in the housing 33.

Although the present invention has been described above in terms of certain preferred embodiments, it is anticipated that other uses, alterations and modifications thereof will become apparent to those skilled in the art given the benefit of this disclosure. It is intended that the embodiments described above be interchangeable, e.g. one or more element of any of the embodiments may be interchanged with any of the elements of any other embodiment. It is also intended that the following claims be read as covering such alterations and modifications as fall within the true spirit and scope of the invention.

What is claimed is:

1. A fitting for a terminal sub-assembly, adapted to receive a connector pin, comprising:
   a generally annular isolator having a generally central bore defining a connector pin socket adapted to receive the connector pin, and a reverse clip cap socket; and
   a reverse clip cap configured to be received substantially concentrically by the reverse clip cap socket of the isolator and defining a connector pin end socket configured to engage the connector pin, and having a deflectable wall with a configuration for securing the connector pin to be received into the connector pin socket of the isolator,
   wherein the reverse clip cap and the isolator are operative to interlock when the fitting is mated with the connector pin.

2. The fitting of claim 1, wherein the connector pin socket and the reverse clip cap socket define opposite ends of the central bore of the isolator.

3. The fitting of claim 1, wherein the reverse clip cap in assembly with the isolator is substantially coaxial with the connector pin socket.

4. The fitting of claim 1 wherein the isolator is made of a soft plastic.

5. The fitting of claim 1 wherein the reverse clip cap is made of hard plastic.

6. The fitting of claim 1 wherein reverse clip cap is configured to snap fit into the reverse clip cap socket of the isolator.

7. A terminal sub-assembly, adapted to be mounted on a connector pin, comprising:
   a housing defining a laterally extending isolator socket,
   a generally annular isolator configured to be received substantially concentrically by the isolator socket of the housing and having a generally central bore defining a connector pin socket, adapted to receive the connector pin, and a reverse clip cap socket; and
   a reverse clip cap configured to be received substantially concentrically by the reverse clip cap socket of the isolator and defining a connector pin end socket configured to engage the connector pin, and having a deflectable wall with a configuration for securing the connector pin to be received into the connector pin socket of the isolator, that in assembly with the isolator is substantially coaxial with the connector pin socket,
   wherein the reverse clip cap and the isolator are designed to interlock with one another when the terminal sub-assembly is mated with the connector pin so as to prevent extraction of the connector pin from the terminal sub-assembly and
   wherein the housing is a core adjuster comprising:
   an outer body defining a slideway;
   a slider longitudinally slidably mounted in the slideway of the outer body, defining a laterally extending isolator socket; and
   a lock for releasably fixing the longitudinal position of the slider in the slideway.

8. The terminal sub-assembly of claim 7, wherein the generally annular isolator is configured to be received substantially concentrically by the isolator socket of the slider.

9. The terminal sub-assembly of claim 7 wherein the core adjuster further comprises a connector rod extending longitudinally from the housing.

10. An assembled terminal sub-assembly adapted to mate with a connector pin comprising:
    a housing defining a laterally extending isolator socket;
    a generally annular isolator seated substantially concentrically in the isolator socket of the housing and having a generally central bore defining a connector pin socket, adapted to receive the connector pin, and a reverse clip cap socket; and
    a reverse clip cap seated substantially concentrically in the reverse clip cap socket of the isolator and defining a connector pin end socket adapted to engage the connector pin, and having a deflectable wall with a configuration for securing the connector pin received into the connector pin socket of the isolator, that is substantially coaxial with the connector pin socket,
    wherein the reverse clip cap and the isolator have corresponding configurations such that when the connector pin is inserted into the connector pin end socket of the reverse clip cap the deflectable wall is pressed against the central bore of the isolator thereby engaging the corresponding configuration interlocking the reverse clip cap and the isolator and securing the connector pin.

* * * * *